(12) United States Patent
Pointer et al.

(10) Patent No.: US 11,340,334 B2
(45) Date of Patent: *May 24, 2022

(54) MONITORING AND ALERT APPARATUS AND METHODS FOR RADOME PERFORMANCE AFFECTED BY DIRT OR DEBRIS

(71) Applicant: PRECO ELECTRONICS, LLC, Boise, ID (US)

(72) Inventors: Kevin Pointer, Kuna, ID (US); Jonathan Paul Cole, Caldwell, ID (US)

(73) Assignee: Preco Electronics, LLC, Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/908,662

(22) Filed: Jun. 22, 2020

(65) Prior Publication Data

US 2020/0319299 A1 Oct. 8, 2020

Related U.S. Application Data

(63) Continuation of application No. 15/696,090, filed on Sep. 5, 2017, now Pat. No. 10,690,751.

(Continued)

(51) Int. Cl.
*G01S 7/40* (2006.01)
*G01S 13/931* (2020.01)
(Continued)

(52) U.S. Cl.
CPC ............ *G01S 7/4004* (2013.01); *G01S 13/04* (2013.01); *G01S 13/931* (2013.01); *H01Q 1/42* (2013.01); *G01S 7/4039* (2021.05)

(58) Field of Classification Search
CPC .... G01S 13/931; G01S 7/4039; G01S 7/4004; G01S 2013/93271; G01S 7/40;
(Continued)

(56) References Cited

U.S. PATENT DOCUMENTS 3,706,919 A 12/1972 Abbe
4,097,796 A 6/1978 Lunden
(Continued)

FOREIGN PATENT DOCUMENTS

DE 19644164 A1 4/1998
JP H10132921 A 5/1998
JP 3244792 B2 1/2002

OTHER PUBLICATIONS

The Staffs of Electronic Space Systems Corporation and Essco Collins Ltd., The Performance and Economics of Radome-Enclosed Antenna Subsystems, 25 Meter Millimeter Wave Telescope Memo No. 134, Jan. 1980, National Radio Astronomy Observatory Library, https://nrao.edu/25m.shtml.

(Continued)

*Primary Examiner* — Olumide Ajibade Akonai
(74) *Attorney, Agent, or Firm* — Lee & Hayes, P.C.

(57) ABSTRACT

A monitoring and alert system for a radar-based object detection device has a blockage detection circuit including elements that detect and warn of radar blockage from dirt or debris on a radome. Environmentally-applied or human-applied material becoming attached to a surface of the radome can block the radar signal from being radiated, or a target return/echo from being received, at a sufficient power level. The monitoring and alert system prevents a vehicle operator from assuming that the unit is functioning properly and that no targets exist in the radar field of view, when the radar is actually blocked by the dirt and debris. One electrode, or multiple spaced-apart electrodes, on the radome may be monitored for each electrode's respective "self-capacitance". Thus, different regions of the radome may be separately and independently monitored for alerts when one or more regions of the radome are negatively-affected by the dirt or debris.

24 Claims, 12 Drawing Sheets

Related U.S. Application Data

(60) Provisional application No. 62/383,228, filed on Sep. 2, 2016.

(51) Int. Cl.
    *G01S 13/04* (2006.01)
    *H01Q 1/42* (2006.01)

(58) Field of Classification Search
    CPC ........ G01S 7/4047; G01S 13/04; G01S 7/027; G01S 7/03; H01Q 1/42; H01Q 1/3233; H01Q 1/02; G01F 23/242; G01N 27/02
    See application file for complete search history.

(56) References Cited

U.S. PATENT DOCUMENTS

| | | | |
|---|---|---|---|
| 4,766,369 A | 8/1988 | Weinstein | |
| 4,999,639 A * | 3/1991 | Frazita | H01Q 1/02 343/704 |
| 5,066,921 A * | 11/1991 | Rope | H01Q 1/42 324/639 |
| 5,485,159 A | 1/1996 | Zhang et al. | |
| 6,469,659 B1 | 10/2002 | Lajiness et al. | |
| 6,611,227 B1 | 8/2003 | Nebiyeloul-Kifle et al. | |
| 6,686,872 B2 | 2/2004 | Vacanti | |
| 6,954,172 B2 | 10/2005 | Hofmann et al. | |
| 7,541,970 B1 | 6/2009 | Godfrey et al. | |
| 8,698,508 B2 * | 4/2014 | Grimm | G01M 5/0083 324/649 |
| 8,791,707 B2 | 7/2014 | Bowler et al. | |
| 8,823,582 B2 | 9/2014 | Himmelstoss et al. | |
| 9,453,910 B2 | 9/2016 | Elwart et al. | |
| 10,267,897 B2 | 4/2019 | Jenkins | |
| 10,690,751 B2 * | 6/2020 | Pointer | H01Q 1/42 |
| 2009/0243912 A1 | 10/2009 | Lohmeier et al. | |
| 2012/0013354 A1 | 1/2012 | Bowler et al. | |
| 2012/0020188 A1 | 1/2012 | Mielenz | |
| 2012/0032838 A1 | 2/2012 | Heilmann et al. | |
| 2012/0050093 A1 | 3/2012 | Heilmann et al. | |
| 2015/0177303 A1 | 6/2015 | Ebling | |

OTHER PUBLICATIONS

Robert A. Feeler. Proper Radome Care Is Essential to Peak Performance, Flight Safety Foundation, Aviation Mechanics Bulletin, Jan./Feb. 1992. pp. 1-8.

European Search Report, in related Application No. EP 17 18 9023, Applicant: Preco Electronics LLC, Date of completion: Jan. 25, 2018.

* cited by examiner

MONITORING AND ALERT APPARATUS AND METHODS FOR RADOME PERFORMANCE AFFECTED BY DIRT OR DEBRIS

This application is a Continuation of U.S. Non-Provisional application Ser. No. 15/696,090, Filed Sep. 5, 2017, entitled "Monitoring and Alert Apparatus and Methods for Radome Performance Affected by Dirt or Debris", issuing as U.S. Pat. No. 10,690,751 on Jun. 23, 2020, which claims benefit U.S. Provisional Application Ser. No. 62/383,228, filed Sep. 2, 2016, and entitled "Testing and Alert Apparatus and Methods Regarding Radome Performance Compromised by Dirt and Debris", the entire disclosures of which applications are incorporated herein by this reference.

BACKGROUND OF THE DISCLOSED TECHNOLOGY

Field of the Invention

The invention relates to operation and monitoring of performance of a radome, for example, for a radar-based object detection unit/device such as those used on a vehicle to warn a driver/operator of an obstacle near, or in the path of, the vehicle. More specifically, the apparatus and methods allow monitoring of the radome of a radar-based unit to send an alert/alarm if there is a decline in the radome's ability to permit transmitted radar signals, and return echoes, to pass through the radome with minimum distortion and absorption.

Related Art/Background Information

A radome is a covering designed to protect a radar antenna from the environment. Electrically, a radome should permit the radar's transmitted signals and echoes (outgoing and incoming, respectively) to pass through with minimum distortion and absorption. If the system is blocked by material on the radome, it will appear as though there are no targets in its field of view. The system will then effectively be blind. This would lead an operator to believe that no targets exist within the radar field of view. Operator decisions based on this information could result in damage to a machine, other equipment, downtime, or loss of life. Effective performance of radar-object-detection equipment will be significantly compromised, that is, significantly negatively affected, if dirt or debris rests on, coats, sticks to, or otherwise becomes attached to the radome. Examples of such dirt or debris include soil, water, ice, mud, dust, dirt, debris, grime, road-oil, asphalt, industrial chemicals, paint, hand-oils, or other smudges or layer(s) of environmentally-applied or human-applied material attached to the radome. Even slight soiling or coating of the radome can interfere with the desired clean, non-distorted, reflection-free "antenna view" through the radome. Therefore, dirt or debris on the radome can reduce the ability of the radar unit to detect an object near or in the path of a vehicle, in effect, making the unit "blind" to the very objects and safety-hazards for which it is needed, because said dirt or debris block or at least interfere with the transmitted radar, and/or the echoes returning from said objects and safety-hazards.

Utility, construction, and heavy-duty vehicles are especially prone to quick and frequent build-up of dirt or debris, due to the dirty industrial environments in which they work. Further, an operator of such a vehicle is often too busy to inspect and clean the radome, and/or frequent inspection and cleaning could in itself be a hazard due the operator having to exit the vehicle in the work/utility environment or during driving in inclement weather.

Conventional radar systems for object-detection safety equipment do not "see" the radome, for example, due to system phase noise, front end filtering, etc. Conventional systems do not monitor or otherwise sense the condition of the radome, and they especially do not monitor, sense, or signal an alarm that dirt or debris is reducing effectiveness of the radome.

In theory, close human examination of the radar-unit radome on a frequent basis might help the problem of a dirty or debris-coated radome. However, the reality is that the radar-based object detection units may quickly be affected by environmental dirt or debris. Inattention or forgetfulness may prevent frequent human examination. Since the accuracy and effectiveness of an object-detection unit for a utility or construction vehicle, or for any vehicle for that matter, is important for safe operation of the vehicle, the invention represents a significant improvement in this field. Therefore, the automatic monitoring and alerting provided by certain embodiments of the invention may greatly improve the effectiveness of the radar unit, and, hence, the safety of the work-site and/or vehicle travel.

SUMMARY

The invention comprises apparatus and/or methods adapted to monitor and provide a warning/alert of radar system performance-reduction, and more specifically, radome performance-reduction. The invention may monitor a radar-based object detection unit/device on a vehicle, and alert the vehicle operator to problems with detection of the objects or "targets" of the radar, for example, objects such as humans or safety-hazards in the vicinity of the vehicle. Preferred embodiments monitor and alert the operator of reduced radar transmission and/or reduced reception of return echoes due to dirt or debris on the radome of the radar system. Preferred embodiments are especially effective for preventing an operator or other personnel responsible for a vehicle from assuming incorrectly that the radar system is functioning properly and that no targets/objects exist in the radar field of view.

Certain embodiments of the monitoring and alert system may be described as comprising, consisting essentially of, or consisting of a radome blockage detection circuit, wherein the detected blockage is caused by dirt or debris on the radome. Certain embodiments of the blockage detection circuit may be described as comprising, consisting essentially of, or consisting of, one or more electrodes on a radome inner surface (inside the radar objection detection unit); and blockage detection circuitry that preferably comprises signal processing circuitry, algorithm circuitry for analyzing/comparing the processed signal(s) relative to a predetermined threshold(s), and alert/alarm circuitry to actuate audible and/or visual alert/alarm equipment, for example, on or in a vehicle; plus electrical and/or data connectors between these components. Said radome blockage detection circuit is based on electrode self-capacitance, so that each electrode is preferably placed on the inner surface and configured to provide self-capacitance signals/data to said blockage detection circuitry.

Certain embodiments of the monitoring and alert apparatus and methods may be used to excellent advantage on utility vehicles, construction vehicles, mining vehicles, waste management vehicles, and other vehicles frequently in dirty environments. A layer or other buildup of dirt or debris becomes attached to a surface of the radome, can block the radar signal from being radiated, and/or can block the target return/echo from being received, at a power level sufficient for effective operation of the object-detection functions of the radar system. The dirt or debris may be of many types of coating or other build-up of unwanted environmental or human-caused materials adhering to the radome, for example, soil, water, ice, mud, dust, dirt, debris, grime, road-oil, asphalt, industrial chemicals, paint, hand-oils, or other smudges or layer(s) of environmentally-applied or human-applied material.

The monitoring apparatus and methods may be used to continuously or semi-continuously test/detect, and warn, of the problem of reduced radome and radar unit effectiveness, for example, whenever the vehicle and/or the radar unit is turned on. Because the dirt and debris that cause the radome performance-reduction is typically on the outside surface of the radome, the preferred monitoring systems and methods alert the operator or other personnel of the need to clean the outside surface of the radome, after which safer use of the vehicle may be resumed. Thus, rather than random or occasional checks, if any, of the cleanliness of the radome by the operator or a maintenance crew, certain embodiments of the invention may provide automatic testing/checks of the cleanliness that is desired or required for effective performance of the radome and the radar unit.

The preferred embodiments comprise addition, to a conventional radar object detection unit, of one or more electrodes attached to a radome of the unit, and apparatus for monitoring of the self-capacitance of each of said one or more electrodes. The self-capacitance of an individual electrode attached directly to the surface of the radome indicates the condition of the portion/region of the radome at or near to that individual electrode. This way, the self-capacitance of an individual electrode will indicate when the condition of that region/portion of the radome is blocked or otherwise of reduced effectiveness for transmitting a radar wave/signal out from the unit, and/or for receiving a target return/echo into the unit.

Providing only a single electrode attached directly and in contact with the radome, and monitoring the self-capacitance of that single electrode, is sufficient in certain embodiments. Providing multiple electrodes attached directly and in contact with the radome, and monitoring the self-capacitance of each of the multiple electrodes separately and independently, is preferred in certain embodiments, as the multiple electrodes may test/sense the cleanliness of multiple, different regions of the radome. It is preferred that multiple electrodes are attached to regions of the radome that are distanced from each other, for example on opposite sides of the radome. This allows monitoring of distanced radome regions, which each may be exposed to different environmental conditions, and which may therefore have different tendencies to become fouled/coated by dirt or debris.

These and other objects and benefits of certain embodiments of the invention will be further described, and illustrated, by the following description and the drawings.

DETAILED DESCRIPTION OF CERTAIN EMBODIMENTS

Figure 1:
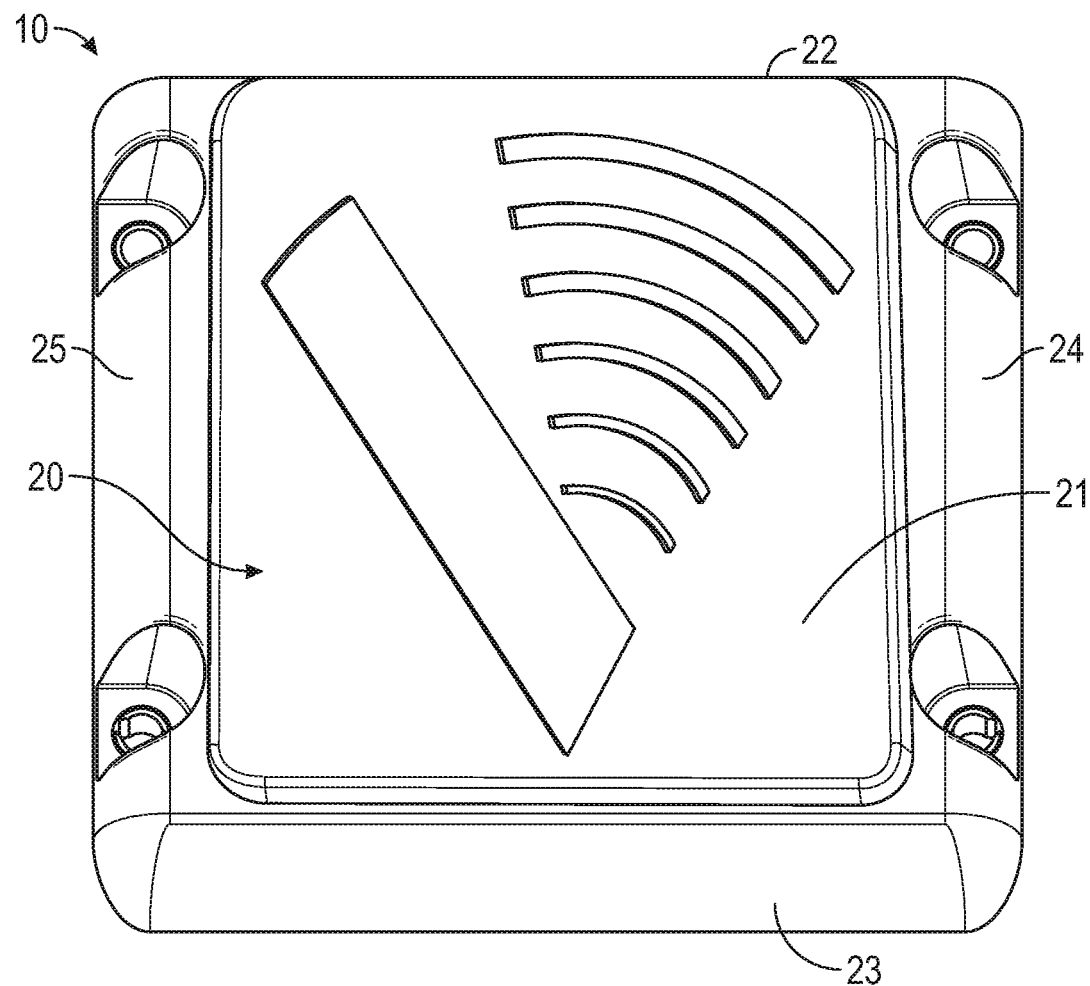
FIG. 1 is a front perspective view of one, but not the only, embodiment of a radar-based object detection unit/device adapted to include an embodiment of the invented monitoring and alert system.

Referring to the Figures, there are shown several, but not the only, embodiments of the Monitoring and Alert Apparatus and Methods for Radome Performance Affected by Dirt or Debris. A radome may be described as a structural, typically weatherproof enclosure that protects a radar antenna and that is constructed of material that minimally attenuates the electromagnetic signal transmitted or received by the antenna. Therefore, a s discussed above, if the radome is coated or otherwise blocked, partially or entirely, by dirt or debris, radar-based object detection unit may not view all or any of the targets in its normal field of view. The system will then effectively be blind, and this may lead an operator to believe that no targets exist within the radar field of view. Operator decisions based on this information could result in damage to a machine or other equipment, downtime, or loss of life.

The monitoring and alert system may be described as a blockage detection circuit that comprises, consists essentially of, or consists of, a capacitive sensing circuit. The blockage detection circuit may be constructed using one or more integrated circuits or a discrete component implementation. This circuit has its one or more sensing electrodes installed on the inner surface of the radar radome, for example, a rear surface of the radome that faces the radar antenna and other internals of the unit. Preferably, as one may understand from this document and the drawings, all of said one or more electrodes is/are only on the inner surface of the radome, not on the outer surface of the radome, and not on both inner and outer surfaces of the radome. The electrodes can be made of foil tape, thin metal, or vapor deposition of metal. They may be installed in the radome with pressure sensitive adhesive or alternatively can be molded in as part of the radome manufacturing process, for example. This provides intimate contact between the electrodes and the radome material. A connection from the electrodes to the blockage detection circuit can be made using springs such as shown in the figures, other shapes and formations of wire(s), brushes, pogo pins, or other conductive connectors, such that connection is maintained during thermal expansion and contraction of the radar sensor assembly. The blockage detection circuit is calibrated, and then monitored by the radar's processor during radar system operation.

During initial construction and test of a radar sensor, the blockage detection circuit will be calibrated. This calibration is done while the radome surface is clean, free of debris, and facing free space. The radar processor will use these calibration measurements for each of the one or more electrodes and store them as a baseline for each of the one or more electrodes. These baseline capacitance measurements (in preferred embodiments, self-capacitance of individual electrode(s)) will be used by the processor to calculate a measurement threshold. The term "self-capacitance" is well-known in the electrical arts, and is differentiated therein and in this document from "mutual capacitance".

During the preferred radar system operation, each of the electrode's self-capacitance will be measured and compared against the calculated threshold. The processor will determine if any electrode's self-capacitance measurement has changed enough to cross the calculated threshold. If this crossing of the threshold occurs for any electrode, the processor will trigger an alarm/alert, indicating to the operator that the radar system is blocked. Then, remediation may be done, typically immediate cleaning of the radome, or, at a minimum, the operator's stopping his/her reliance on the radar unit as a safety measure until the cleaning may be done and, in the meantime, using other safety measures for operation of the vehicle.

An important feature of the preferred embodiments is that the apparatus for the monitoring and alert system may be installed/incorporated into a radar unit with limited or no impact on the overall size of the radar unit. As shown in the Figures and described in more detail below, the apparatus for the monitoring alert system may be accomplished by addition of at least one electrode electrically connected to on one or more printed circuit boards (with "microprocessors" or "chips") preferably inside the radar unit, for signal calibration, signal processing, and algorithms and threshold information for monitoring and for alerting the operator of a radome problem, for example.

The radar unit size may be maintained in a compact and/or portable range, as the electrode(s) and extra programming/circuitry take up little space. The monitoring and alert system may supplement a conventional radar unit's conventional antenna and processor apparatus and capabilities, rather than replacing or interfering said conventional apparatus and capabilities. Examples of radar units that may be retrofit, or preferably manufactured OEM with embodiments of the disclosed monitoring and alert systems, are those manufactured and/or sold by Preco Electronics, Inc. of Boise, Id., USA. See Preco Electronics, Inc.'s website "preco.com". Also, radar units made and/or sold by other companies, for similar applications or different applications compared to those of Preco Electronics, Inc., may be retrofit or made OEM with embodiments of the monitoring alert system.

Referring now specifically to the Figures, there are shown examples of radar-based object detection units that are commonly attached to a vehicle to sense objects around the vehicle, wherein the units are adapted to monitor cleanliness of the radome, by means of monitoring self-capacitance of an electrode attached to the radome, to alert when radome performance-reduction is likely. As described above, a radome blockage detection circuit is calibrated at the time of radar sensor construction to sense a clean and blockage-free radome surface. Once installed in the field, the blockage detection circuit can be monitored by the system processor for buildup of material (said "dirt or debris" discussed above) on the radome surface, so that when even a single electrode's sensed self-capacitance crosses a predetermined threshold results in the blockage detection circuit sending an alert/alarm.

Figure 4:
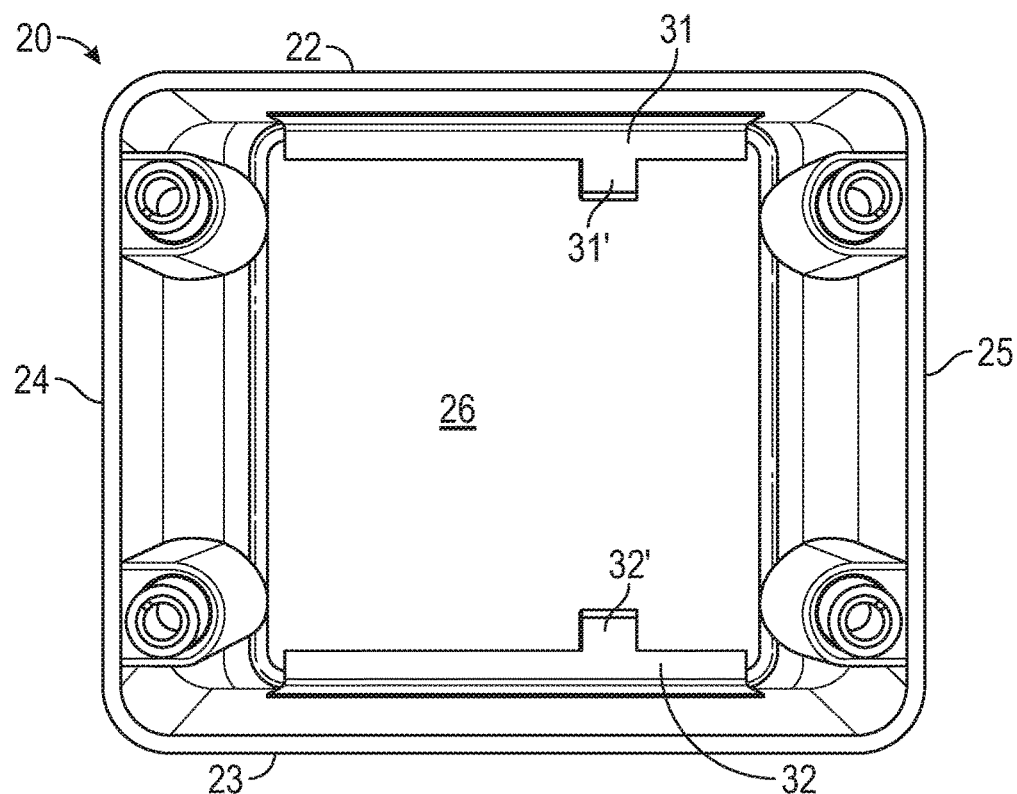
FIG. 4 is a rear view of the radome of the embodiment of FIG. 1, which may be called the front half of the unit, wherein two electrodes are installed on the inner surface of the radome near the top and the bottom of the radome when the unit is oriented as typically installed on a vehicle.
Figure 5:
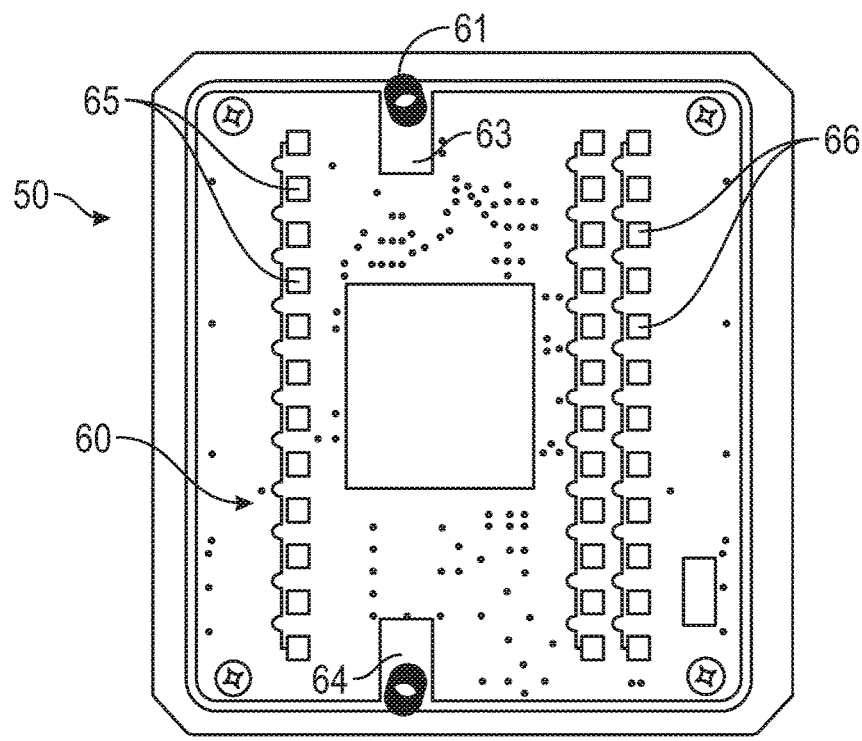
FIG. 5 is a front view of the antenna and processor portion of the embodiment of FIG. 1, which may be called the rear half of the unit, showing two self-capacitance sensor integrated circuit microchips (or "sensor chips") and two spring-connectors that contact the two electrodes on the radome, to electrically connect the electrodes to the sensor chips when the unit is assembled.
Figure 6:
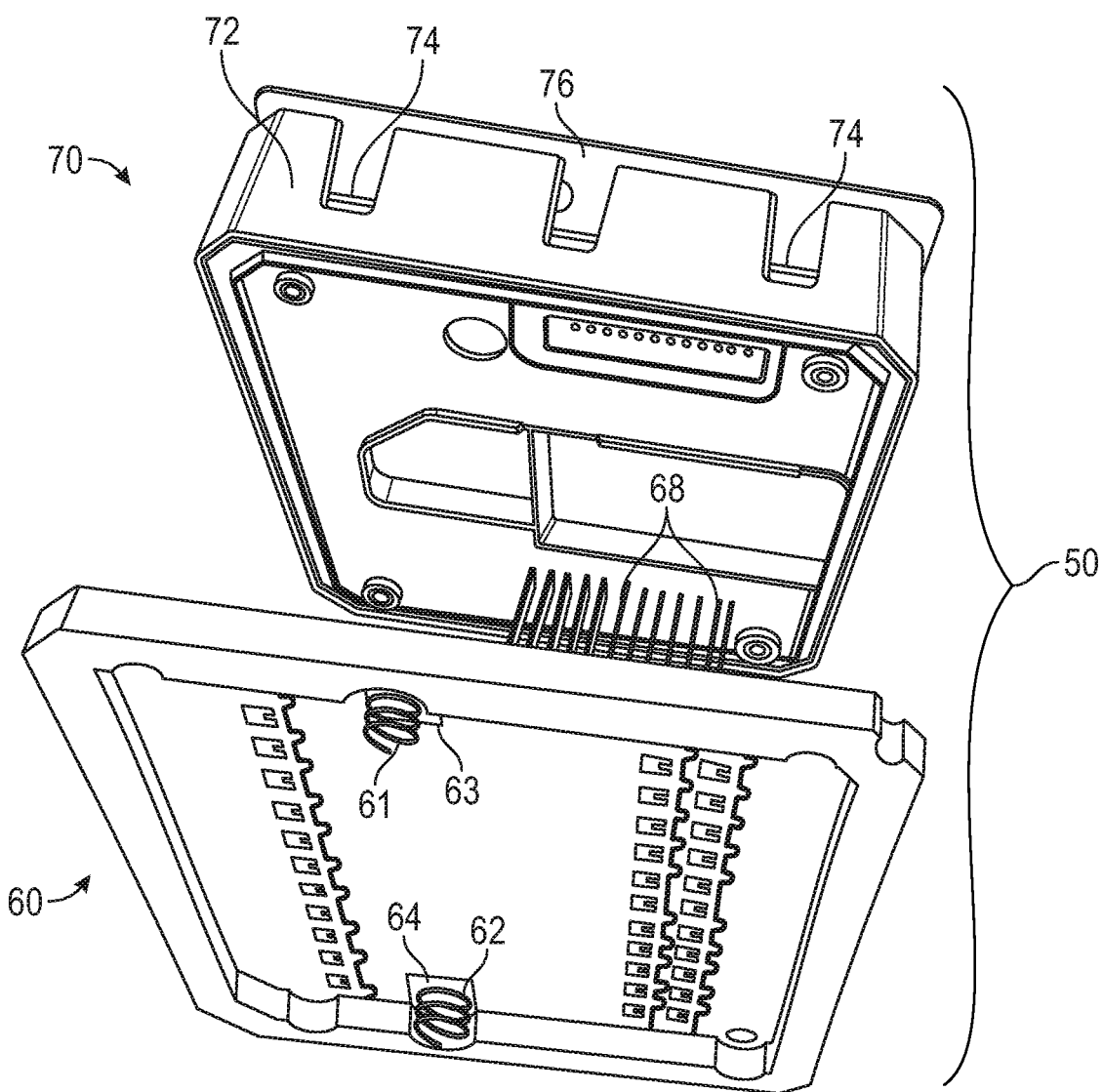
FIG. 6 is an exploded, top perspective view of the rear half of the embodiment of FIG. 1, that is, of the embodiment of FIG. 5, which comprises a front antenna board and a rear processor unit.

FIGS. 1-7 portray a radar-based object detection device/unit 10 that has been adapted/configured to include an embodiment of the monitoring and alert system of the invention. The "front half" or "front cover" of unit 10 is radome 20, which includes a front wall 21, top and bottom sidewalls 22, 23, and right and left sidewalls 24, 25, wherein these walls 21, 22, 23, 24 and 25 form most of the outer surface of the unit 10. The radome 20 is connected to, and covers most of the "rear half" 50 of unit 10, which comprises antenna plate 60 and processor unit 70. On the back of the processor unit 70 is an electromagnetic interference (EMI) coverplate 26, through which passes the processor unit 70 power and data electrical cable 52 for connection to a power source, and also the alarms, camera, and/or other electronic systems of the vehicle. Cable 52 may include a conventional connector (not shown) for connection to said power source and electronic system of the vehicle, for example, a DEUTSCH™ brand connector or a CONXALL™ brand connector. In FIG. 6, one may see to best advantage the casing 72, the inner surface 76 of the EMI cover, and edges of the circuit board 74 that is held inside the casing 72. A rigid back extremity cover (not shown) may be included in certain embodiments.

Figure 3:
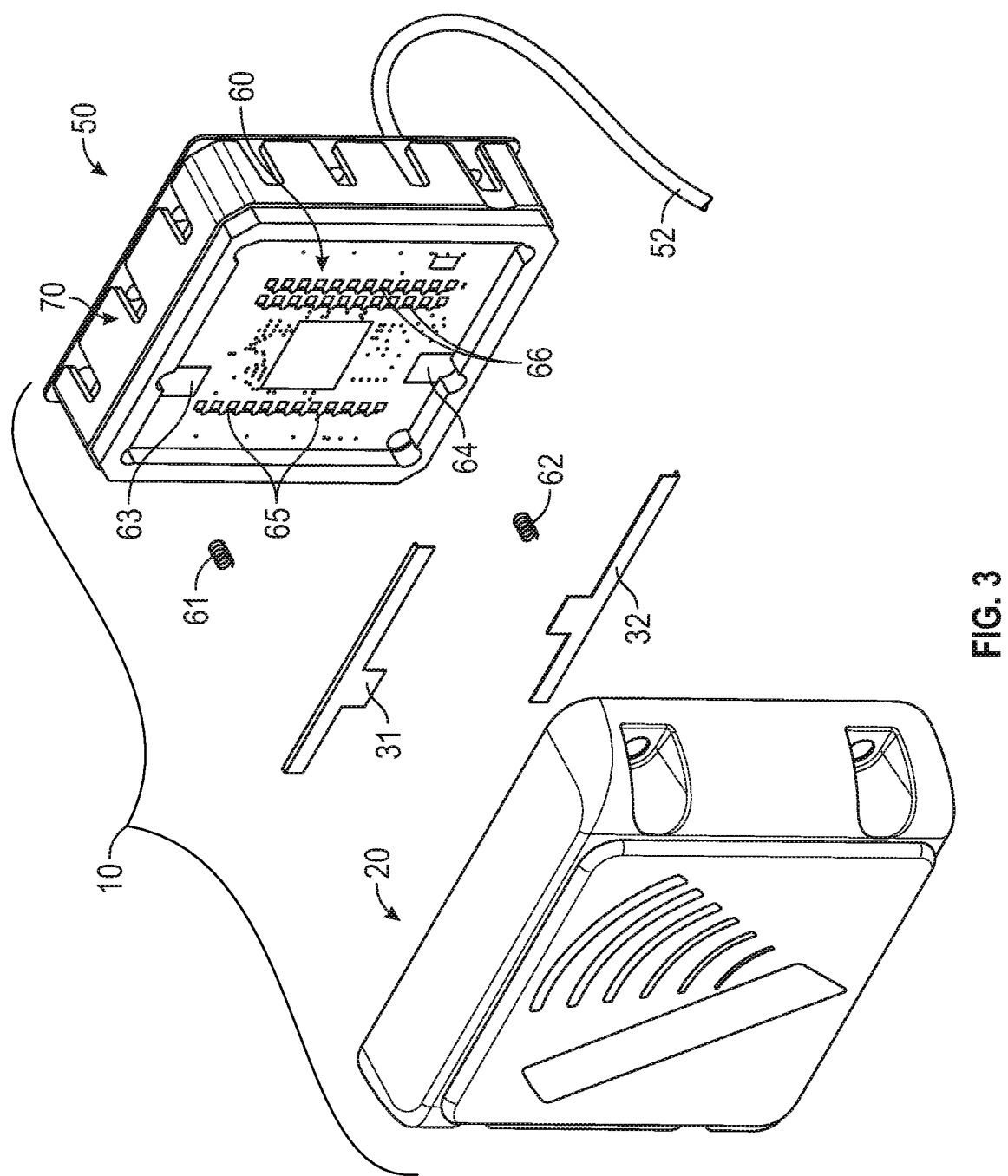
FIG. 3 is an exploded, right-front perspective view of the embodiment of FIG. 1.

The radome 20 have a generally convex and rounded-corner shape when viewed from the front (FIGS. 1 and 3) and a generally concave and rounded-corner shape when viewed from the rear (FIG. 4). The radome 20 may be described as being of a substantially uniform thickness except for the four portions portrayed near the four corners of this generally square unit, which receive bolts (not shown except in side view in FIG. 2) for assembly of the unit 10 and connection to a vehicle.

Except for the adaptations described herein for the monitoring and alert system, the radome may be a conventional radome, and the unit may be a conventional unit, for example, such as a radar object detection and its radome sold by Preco Electronics, LLC, of Boise, Id., U.S.A. Such a radome may be made of various materials, for example but not limited to, XENOY 5220U™ or an approved polycarbonate. The radome may be injection molded from polymeric material, for example. Preferably, the radome is a single layer of material, not formed of multiple layers or laminated layers. Therefore, the one or more electrodes of the preferred embodiments are not used to testing/monitoring of the internal condition of the radome material, for example, not used to sense spaces or gaps inside the radome material or to sense delamination of multi-layered radome material.

Figure 2:
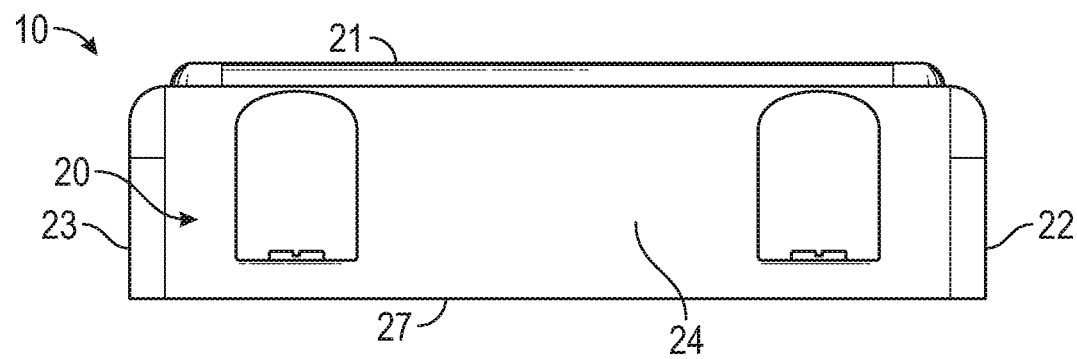
FIG. 2 is a right side view of the embodiment of FIG. 1.

By comparing FIGS. 1, 2, and 3, one may see that the rear half 50 of the unit 10 fits entirely or substantially inside the radome. The front of the antenna plate 60 comes close to portions of the inner surface 26 of the radome but, in conventional units without the monitoring and alert system, only the non-electrically-conductive gasket 67 of the antenna plate 60 contacts the radome inner surface 26. On the front of antenna plate 60 may be seen a row of radar transmitters 65 and two rows of radar receivers 66. Other exemplary conventional antenna board circuitry/components, which will be understood by those of skill in the art, may be seen on the front (FIGS. 3, 5) and on the back (FIG. 7) of the antenna plate 60, for example, the transceiver and associated circuitry 69 shown in FIG. 7.

FIG. 3 is an exploded view of the unit 10 that shows all of the radome 20, the rear half 50 comprising the antenna board 60, and the processor unit 70, the EMI plate 26, and a portion of cable 52, which may be selected from conventional elements in certain embodiments. FIG. 3 also shows the unconventional, added elements that modify the radar object-detection unit to provide the blockage detection circuit of the monitoring and alert system, the added elements comprising two electrodes 31, 32, two self-capacitance integrated circuit microchips (or "sensor chips") 63, 64, and two exemplary connectors 61, 62 that electrically contact/connect the two electrodes 31, 32 to the sensor chips 63, 64. It will be understood from this document and the figures, that the antenna plate 60 and the processor unit 70 will preferably comprise the conventional features, including circuitry, programming, code and/or connections, that are necessary and typical for normal operation of the radar unit 10, but that additional features including circuitry, programming, code, and/or connections, are added to the antenna plate 60 and the processor unit 70 to complete the blockage detection circuit of the radome monitoring and alert system.

After viewing the figures, and reading this document, one of average skill in this field will understand how to design and fabricate the additional circuitry, programming, code and/or connections of various embodiments of the monitoring and alert system.

Figure 7:
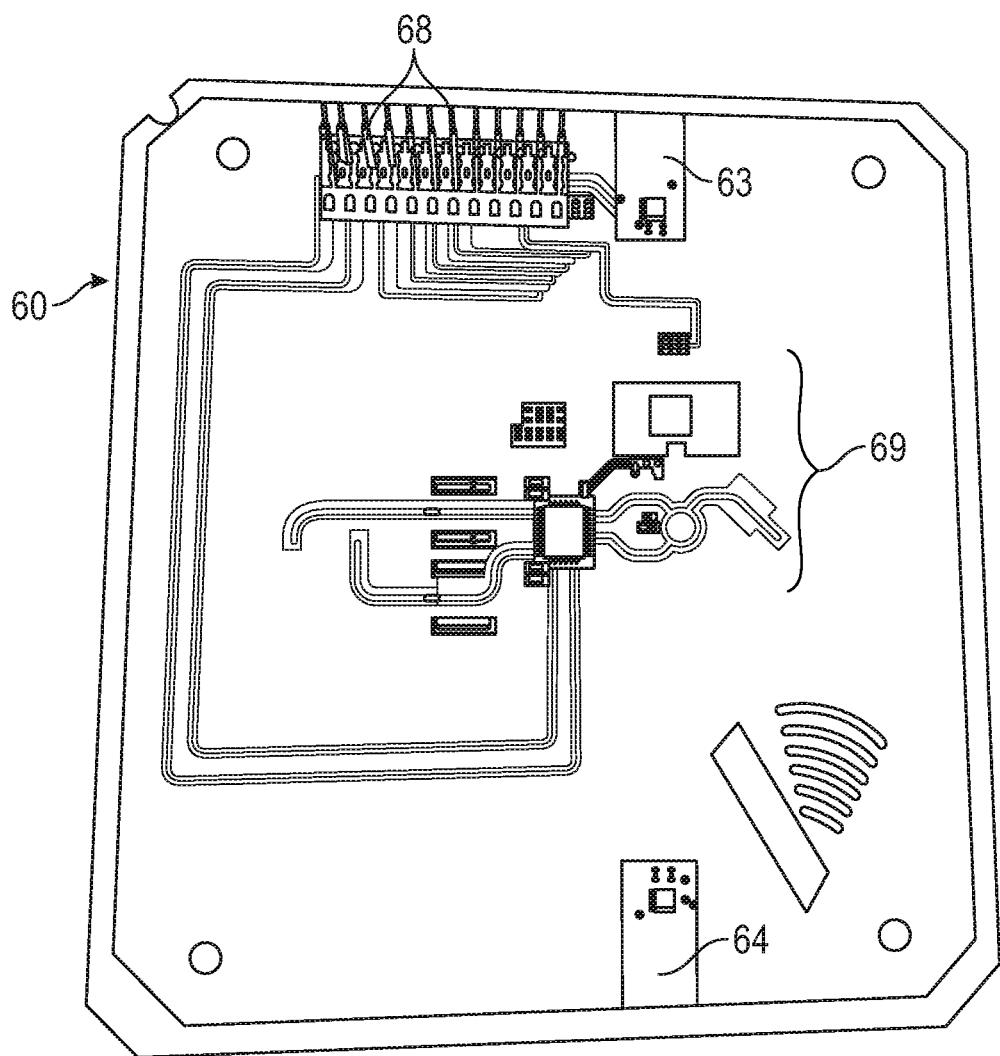
FIG. 7 is a rear perspective view of the antenna board of FIG. 6.

FIG. 4 illustrates the electrodes 31, 32 attached to the inner surface 26 of the radome 20, at the upper corner and the lower corner of the surface 26, respectively. FIG. 5 illustrates the sensor chips 63, 64, and connectors 61, 62 that are connected to and that extend out from the sensor chips 63, 64, to contact electrode portions/tabs 31' 32', respectively, for electrical-connection to the electrodes 31, 32 when the unit 10 is assembled. Electrode portions/tabs 31, 32' each serve as a "connection point" (preferably one per electrode) for contacting and therefore connecting with the connectors 61, 62, whereby the entire electrode is electrically connected to the connectors 61, 62 and the chips 63, 64. FIG. 6 illustrates the antenna board 60 detached from the processor unit 70, and FIG. 7 illustrates the back of the antenna board 60.

The electrodes 31, 32 are each attached preferably permanently, or at least semi-permanently, for example, by pressure-sensitive adhesive. The electrodes 31, 32 extend most of the way along the inside top corner, and the inside bottom corner of the inner surface 26, so that a significant portion of the radome is monitored by the electrodes. The self-capacitance signal from each electrode 31, 32, via its respective connector 61, 62, is provided to the sensor chips 63, 64 for signal processing. Then, via pins 68, each processed signal (along with conventional signals/data from the conventional antenna board transceiver circuitry 69) is provided to the of the processor unit circuit board 74 for determination of whether the condition/lack-of-cleanliness of a monitored region of the radome has crossed over the predetermined threshold to reach an alarm condition. If so, the alarm condition/signal is sent from the processor unit 70, preferably to the onboard audio and/or video or other alarm systems (not shown) in the cab or other location on the vehicle, and/or to other locations and/or mechanisms for safety, informational, and/or data-collection purposes. Each individual electrode, and the processing and algorithm circuitry/programming associated with that electrode, monitors/senses the cleanliness condition of the radome region specific to that electrode, so that multiple electrodes may be used to indicate the condition of multiple, different regions of the radome.

In unit 10 of FIGS. 1-7, and in certain other embodiments, the multiple, independent and separately-sensing, and separately-monitored, electrodes in/on different regions of the radome, provide the desired sensitivity and effectiveness for dirt and debris monitoring, as well as some redundancy in the event of a problem with one element or one blockage detection circuit. The placement of electrodes on the radome will be understood to be advantageous in view of the orientation in which the unit 10 and its radome 20 would typically be installed and used on a vehicle. Such electrodes may allow quick and effective sensing of build-up of dirt and debris in various regions that are relatively distanced from each other, and the resulting degradation of the radome performance that can occur with build-up even on a single one of said regions. For example, it could be possible that dirt and debris would build-up from the bottom of the radome toward the top, due to splashing or road-debris coming at the radome from below, for example. In such a case, the bottom electrode would present a considerable change in self-capacitance, but the top electrode might not present/exhibit significant or any self-capacitance change.

Thus, the bottom electrode would trigger the alert/alarm, without a dangerous delay in detection of the performance-reduction of the radar system. In other words, the build-up at or near the bottom region of the radome, that is a partial blocking of the radome, would obscure radar operation, and would be sensed by the bottom/lower electrode, long before the top/upper electrode would sense build-up in the upper region of the radome. Likewise, if snow, rain or ice would start building-up/piling-up on the top of the unit/radome, and/or running down the face of the radome from top to bottom, the top electrode might be the only electrode presenting a change in self-capacitance.

Figure 8:
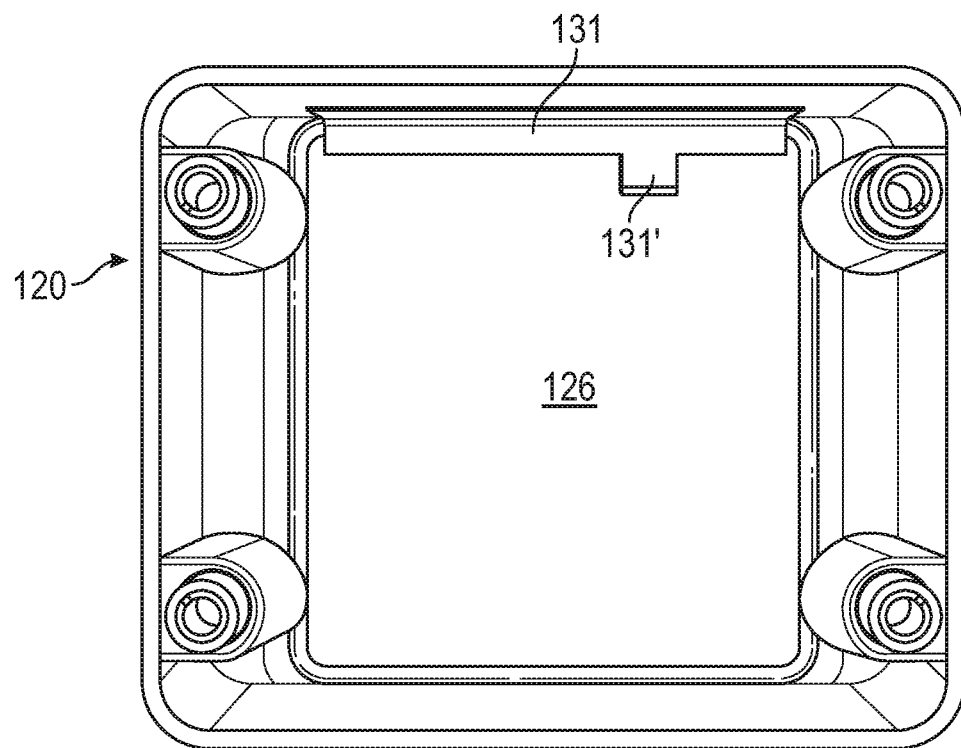
FIG. 8 is a rear view of the radome of an alternative embodiment of a radar-based object detection unit that is adapted to include an embodiment of the invented monitoring and alert system, wherein only one electrode is used.
Figure 9:
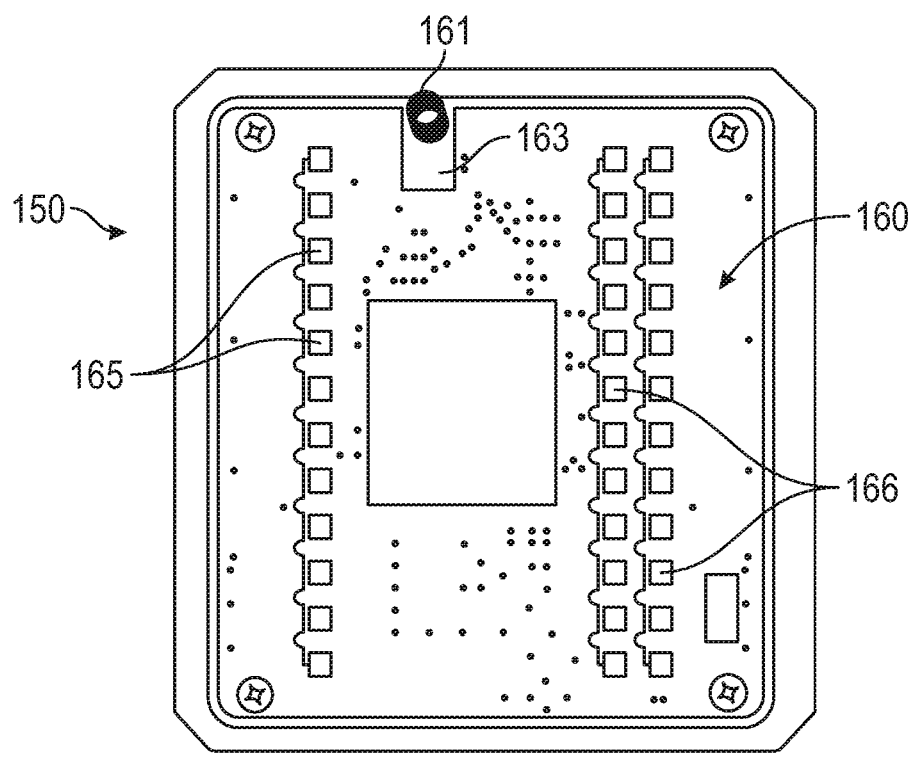
FIG. 9 is a front view of the rear half of a radar-based object detection unit that is adapted to cooperate with the radome of FIG. 8, including only a single self-capacitance sensor chip, and only one spring-connector to contact/connect the single electrode on the radome of FIG. 8 to the single sensor ship when the unit is assembled.

In other embodiments, as illustrated in FIGS. 8 and 9, a radar-based object detection device/unit has a single blockage detection circuit, including a single electrode on the radome, a single connector to a single sensor chip, and circuitry/programming to handle and process the signals needed for monitoring and alert functions associated with only one electrode. Therefore, radome 120 is fitted with only one electrode 131, and the rear half 150 is fitted with only one connector 161 and one self-capacitance sensor chip 163 on the antenna plate 160, and the monitoring and alert circuitry/programming of the unit is adapted for only one electrode 131. Like the electrodes of unit 10, electrode 131 has an electrode portion/tab 131' that contacts the single connector 161 to place the entire electrode in electrical contact with the connector 161 and the sensor chip 163. As in unit 10, the antenna plate 160 comprises radar transmitters 165 and radar receivers 166, and the antenna plate 160 and the processor unit behind the plate 160 but not visible FIG. 9 may have the same or similar circuitry, connector pins, cable and other elements as in unit 10.

Similarly as in the unit 10 of FIGS. 1-7, the electrode 131 is attached to the inner surface 127 of the radome 120 at the top corner of surface 127. No additional electrode is provided on the radome, so that the sole electrode 130 may tend to monitor most effectively the top region of the radome. This may be effective in some embodiments, especially if dirt and debris is most likely to fall on, or otherwise coat, the top region more than any other region of the radome, due to its installed position on a vehicle for example.

An important feature of preferred embodiments is that they rely on self-capacitance of each individual electrode that is connected to the radome. Thus, the preferred apparatus/method is differentiated from what is called in this field "mutual capacitance" and does not include testing of capacitance between two electrodes to monitor the radome. Even if multiple electrodes are used the preferred embodiments rely on the separate and independent self-capacitance readings from each of the multiple electrodes. In other words, each electrode's own self-capacitance monitored, instead of measuring/monitoring mutual capacitance or change-in-mutual-capacitance between a pair of two electrodes. Thus, the preferred embodiments are differentiated from apparatus/methods wherein the relation between multiple electrodes is measured, for example, a pair of electrodes closely spaced together, with material separating the two electrodes acting as dielectric, and the electrodes acting as a capacitors plates. The preferred embodiments are also differentiated from laboratory apparatus and methods wherein two electrodes are connected to a piece of dielectric material, and wherein the laboratory sensor "looks at"/measures the mutual capacitance of the pair of electrodes as a measurement technique to determine the thickness of, and/or delamination of layers of, the material in-between the two electrodes.

The preferred radome unit is sealed to prevent moisture or other "dirt or debris" from entering inside the unit, for example, by the unit being encapsulated in urethane and/or another sealed/continuous casing. Thus, is it very likely that said "dirt or debris" build-up on the radome is on the outside surface of the radome, but not on the inner surface of the radome. In the preferred embodiments, the single, or multiple independent, electrodes, each are affected by the radome dirt and debris on the outside of the radome in the vicinity of that electrode. As the thickness of the radome tends to be small compared to the distance between electrodes, it is likely that the controlling "environment" of each independent electrode is its region of the radome including that region's outer surface, rather than the environment of the other, separately-operating and separately-monitored electrodes each in a relatively distant region of the radome. Because the electrodes independently monitors a region of the radome, each electrode undergoes its own, individual and independent/separate initial factory calibration. After that calibration, then the circuit (integrated or otherwise) provided in the radar unit will separately and independently monitor the amount of self-capacitance that is presented/exhibited by each electrode. As dirt and debris material builds on the outside of the radome, that circuit can detect an increase in self-capacitance due to that debris, particularly for the electrode that is in the region of said dirt and debris. While the absolute value of the radome thickness is not critical in most embodiments, an exemplary radome thickness may be approximately 2-4 mm thick. Therefore, one may see that the distances between independent self-capacitance electrodes (for example, 4-24 inches, or 6-12 inches) may be much greater than the radome thickness. For example, the distance between any two independent self-capacitance electrodes may be greater than 20 times, greater than 40 times, or even greater than 100 times the radome thickness in certain embodiments.

Figure 10:
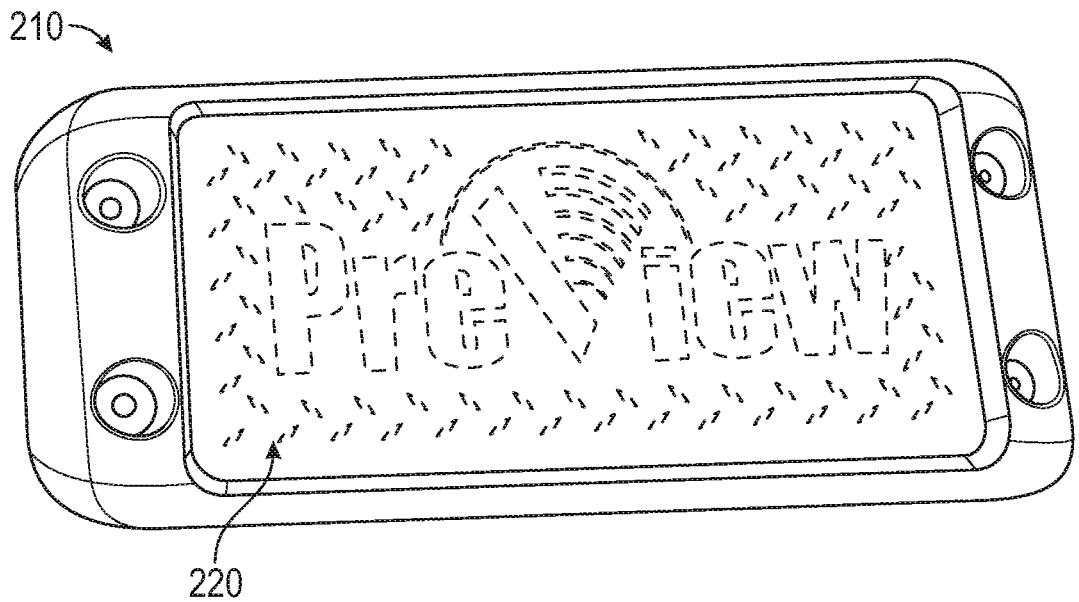
FIG. 10 is a front perspective view of another embodiment of a radar-based object detection unit adapted to include an embodiment of the invented monitoring and alert technology.
Figure 11:
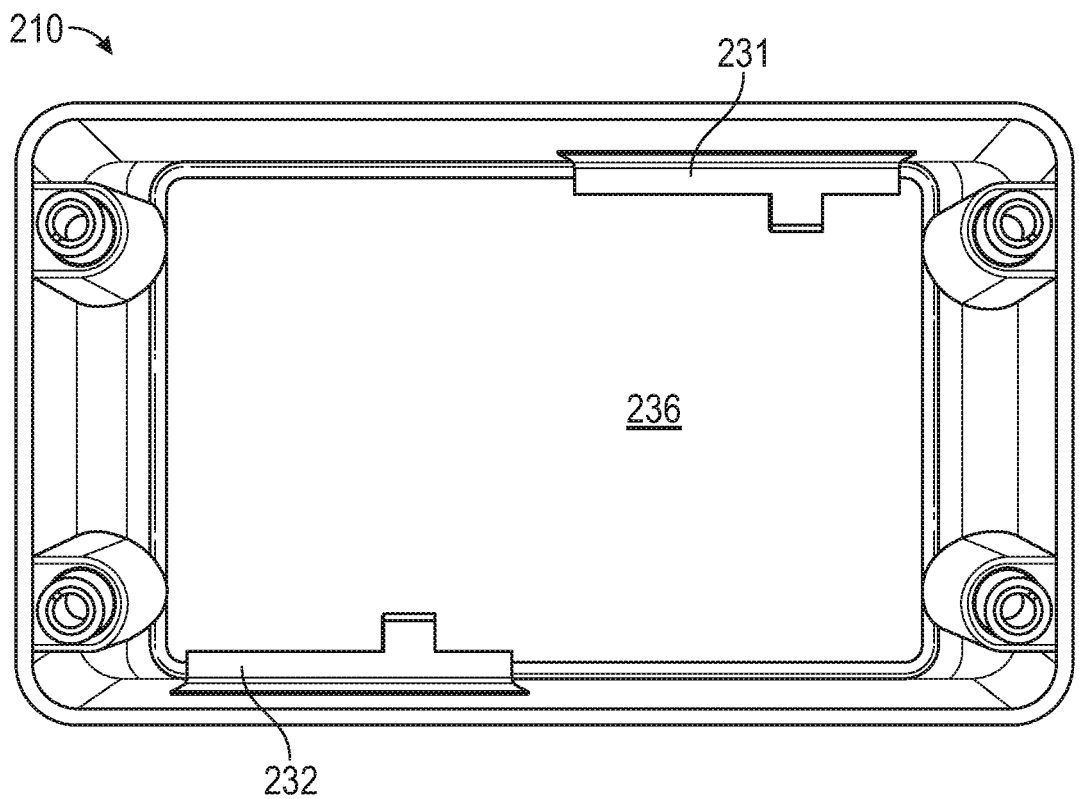
FIG. 11 is a rear view of the radome of the unit of FIG. 10, wherein two electrodes have been installed on the inner surface of the radome, near the top and the bottom of the radome but offset to the left and right sides of the radome.
Figure 12:
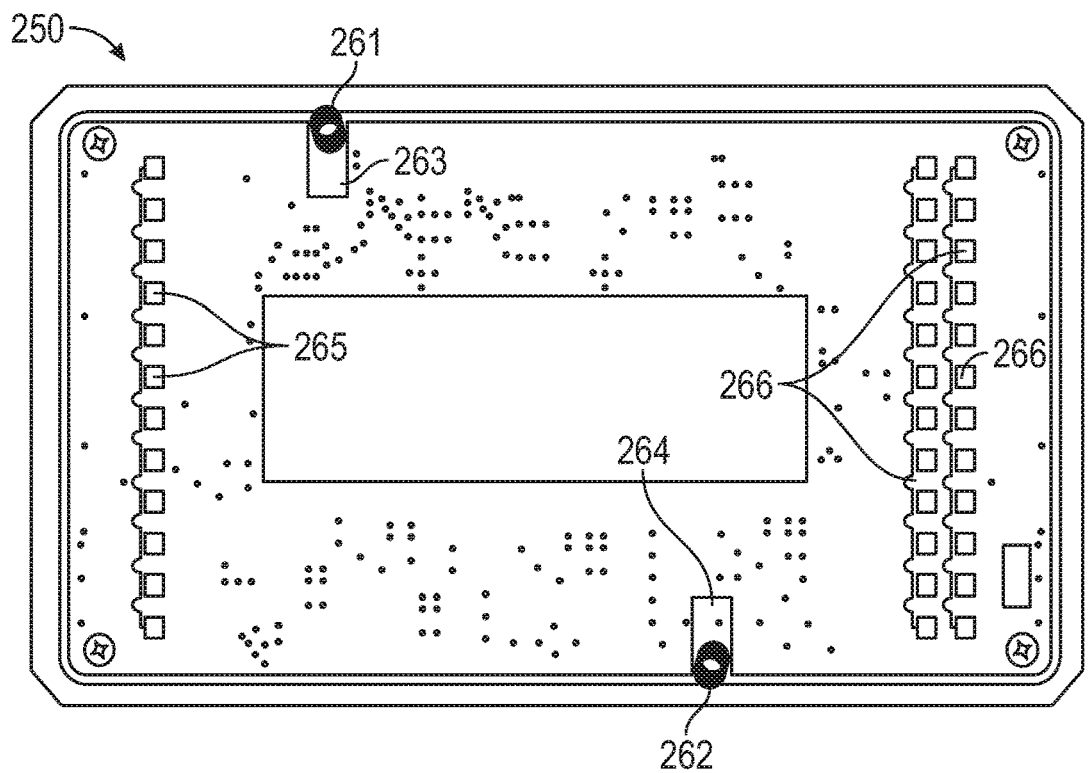
FIG. 12 is a front view of the rear half of the unit of FIG. 10, showing two self-capacitance sensor chips and two spring-connectors that contact/connect the two electrodes on the radome of FIG. 11 to the sensor chips when the unit is assembled.

Alternative electrode placement and/or electrode shape may be used in certain embodiments, as will be understood from the embodiments shown in FIGS. 10-13. FIGS. 10-12 illustrate an alternative radar device/unit 210 that is fitted with an embodiment of the monitoring and alert system. Unit 210 is an elongated, rectangular unit sold by Preco Electronics, Inc. of Boise, Id., USA. Radome 220 comprises two electrodes 231, 232 intimately attached to upper and lower regions of inner surface 226, offset toward the right and left corners of this generally rectangular radome (the right corner being to the right in FIG. 10 and to the left in the rear view of FIG. 11. As will be understood from the above discussion of unit 10, electrode 231 therefore will sense/monitor, via its self-capacitance, the upper right region of the radome, and electrode 232 will sense/monitor, via its self-capacitance, the lower left region of the radome. As will be understood from the above discussion regarding unit 10, radome 210 will connect to and cooperate with the unit 250 shown in FIG. 12, including spring connectors 261, 262, sensor chips 263, 264 of the antenna plate that features conventional radar transmitters 265 and radar receivers 266 and associated circuitry as discussed above.

Figure 13:
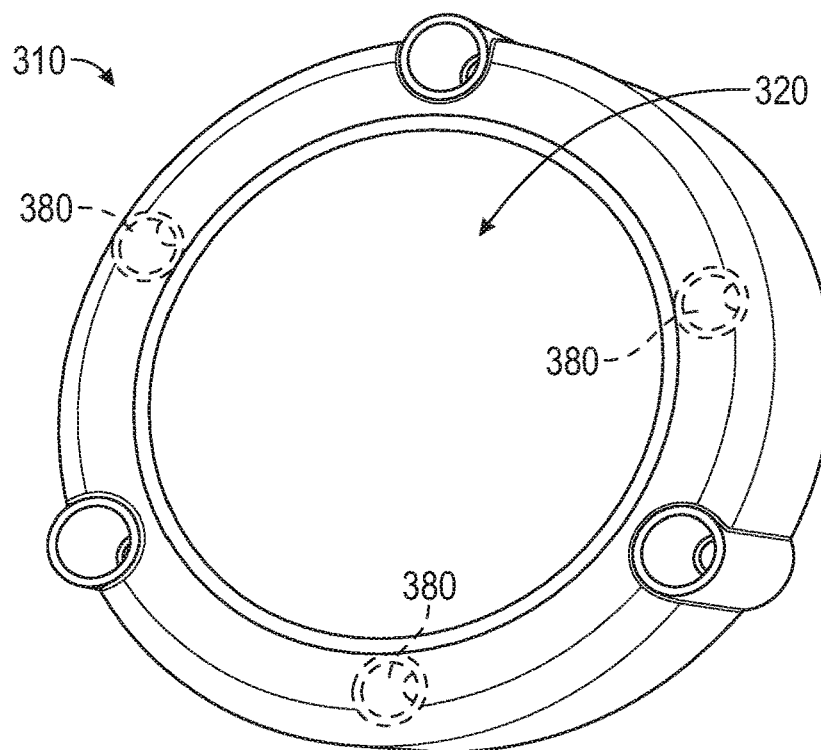
FIG. 13 is a front perspective view of another embodiment of a radar-based object detection unit adapted to include an embodiment of the invented monitoring and alert system, wherein dashed lines indicate three regions of the unit where monitoring apparatus is provided.

The alternative radar device/unit 310 shown in FIG. 13, suggests that many shapes and forms of a radar-based object detection unit may be designed and the elements of the blockage detection circuit may be provided in various numbers and various locations. For example, unit 310 features three sets of electrodes, springs or other connectors, and sensor chips, as illustrated by the three dashed-line regions that are 120 degrees apart in FIG. 13. As will be understood from the above discussion, the other parts of the blockage detection circuit will be adapted to handle and process, and send alerts based on, the signals from the three independent electrodes.

Figure 14:
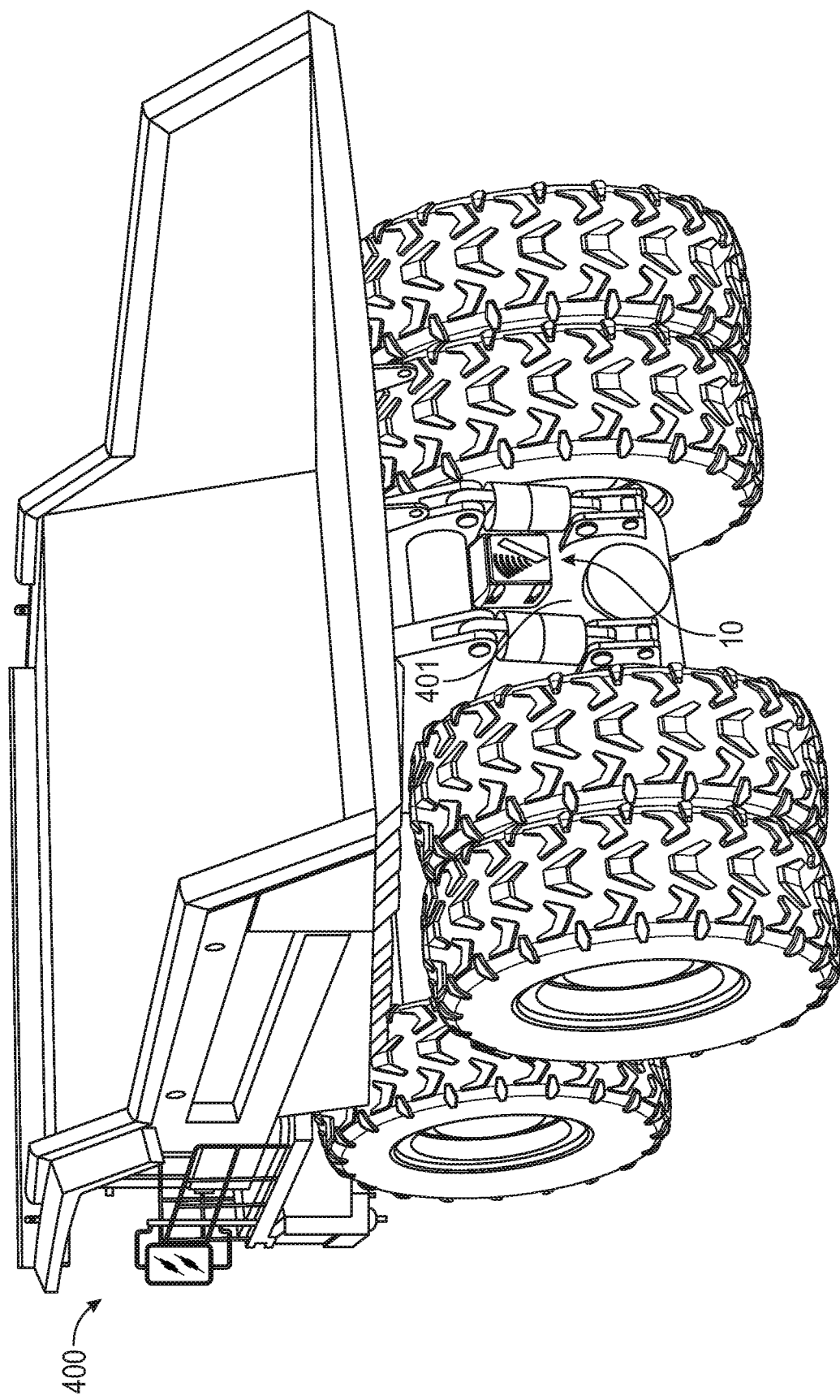
FIG. 14 is a rear perspective view of an exemplary heavy-duty dump truck with the embodiment of FIG. 1 installed on its rear side.
Figure 15:
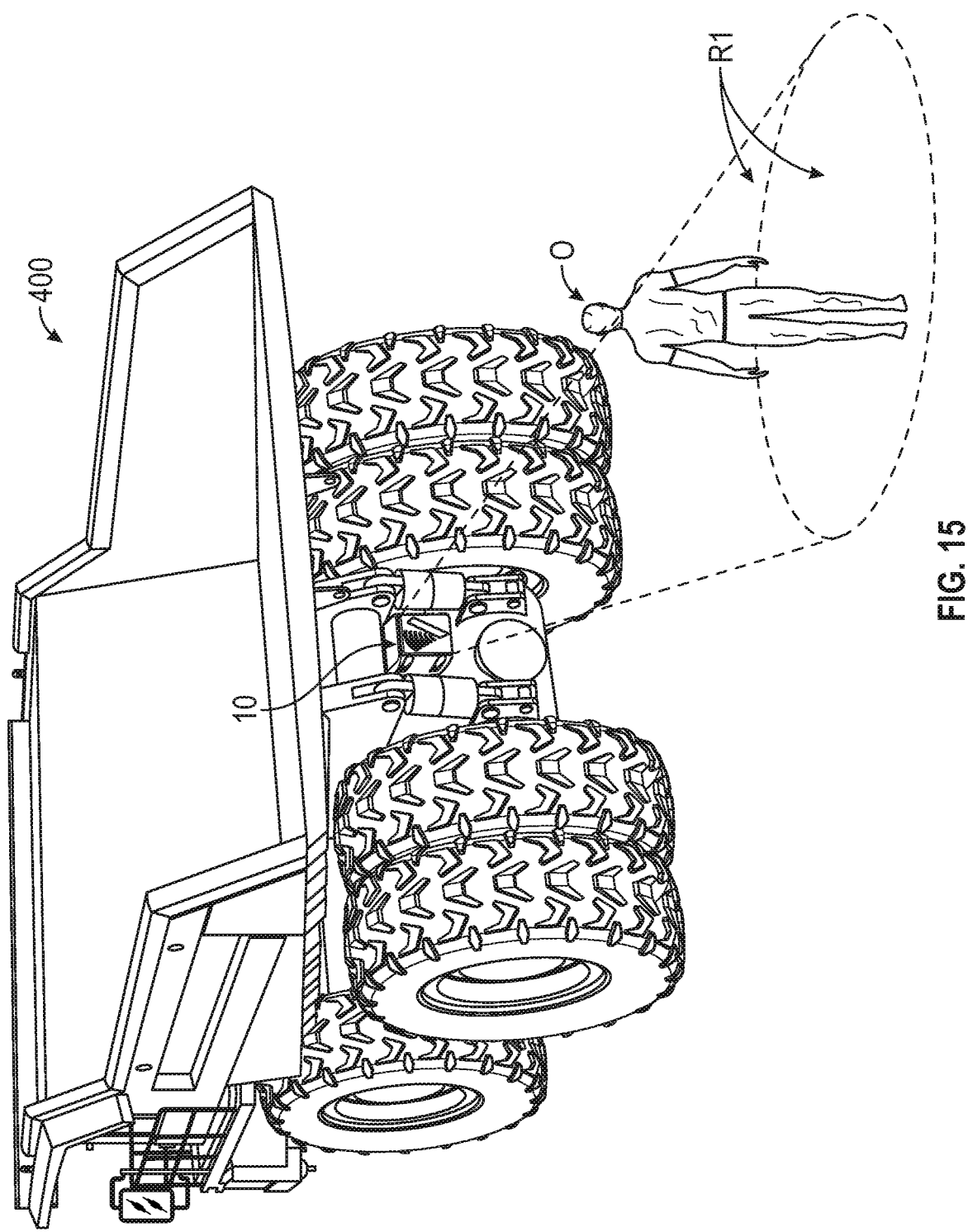
FIG. 15 is a rear perspective view of the truck and embodiment of FIG. 1, wherein the radar-based object detection unit is operating properly due to a clean radome.
Figure 16:
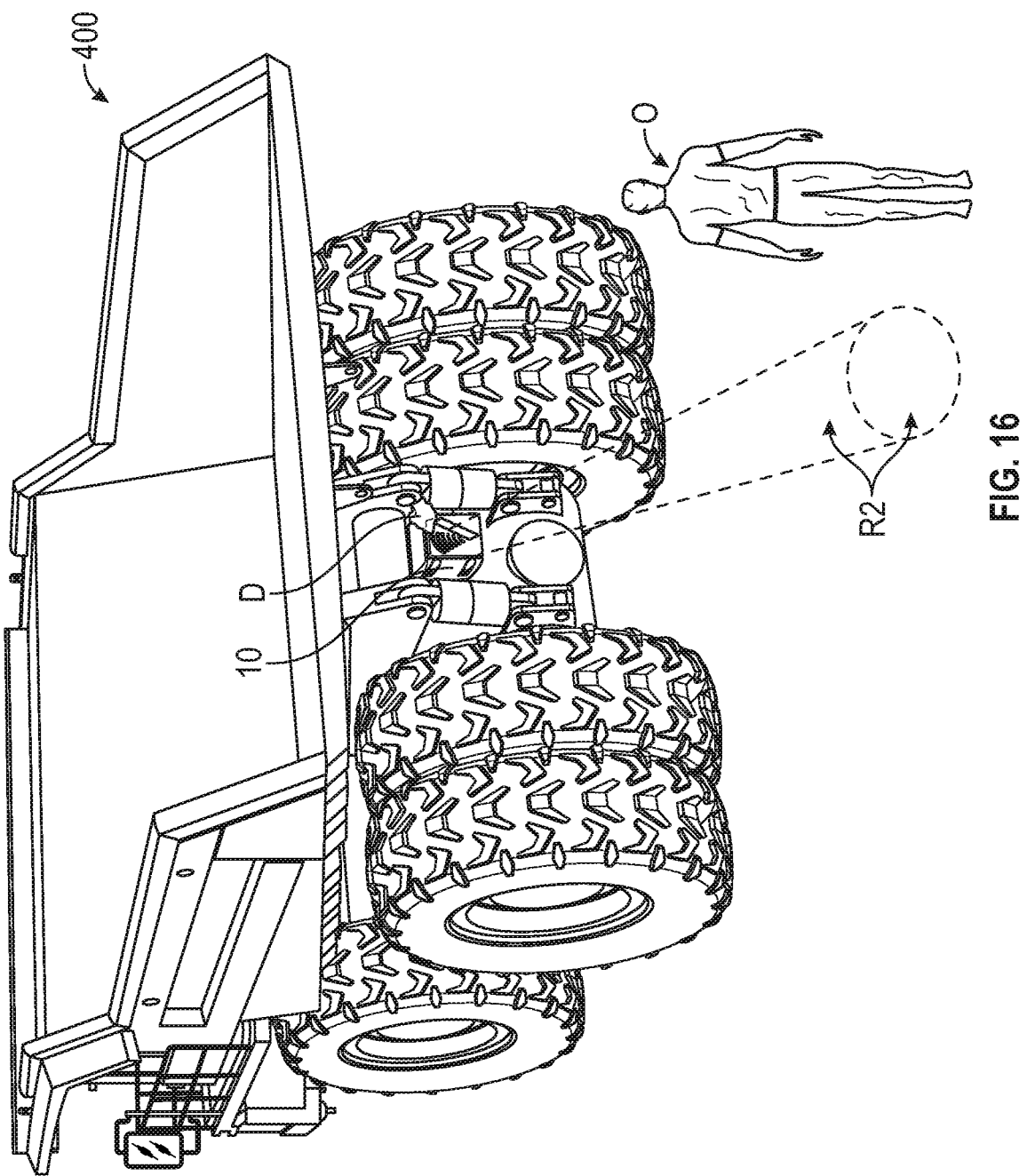
FIG. 16 is a rear perspective view of the truck and the embodiment of FIG. 14 but where dirt or debris has coated a portion of the radome so that the unit does not detect the person behind the truck, but wherein the monitoring system has alerted the operator of the radome performance problem so that the operator can stop movement of the truck, avoid harming the person, and rectify the problem.

In use, an radar-based object detection unit that is adapted as described herein is may be installed on a vehicle and used to safeguard the workers and equipment around the vehicle, and/or the vehicle itself from impacts with other vehicle/equipment. In FIG. 14, unit 10 is installed on an exemplary heavy-duty dump truck 410, by being bolted to a rear surface 401 and electrically connected by a power and data cable to a power source and electronic alarm, video, alert, and/or other data systems of the vehicle (all hidden in FIG. 14). When the radome of unit 10 is clean, operation of the unit effectively detects the person or other object O behind the dump truck 400, as indicated by the schematic, dashed-line radar "view lines" R1 in FIG. 15, and the radome monitoring and alert system is not sensing, or sending an any alert/alarm regarding, dirt or debris. When the radome of unit 10 is dirty, for example, partially covered by dirt and debris D in FIG. 16, the dashed-line radar view lines R2 indicate that the radar unit does not "see" the human or other object O. Because unit 10 includes an embodiment of the invented blockage detection circuit, it will be understood that the unit 10 in FIG. 16 has already alerted the operator of the truck 400 of the reduced-performance of the unit 10, and that the operator (now shown) is exiting the vehicle to clean the radome.

Figure 17:
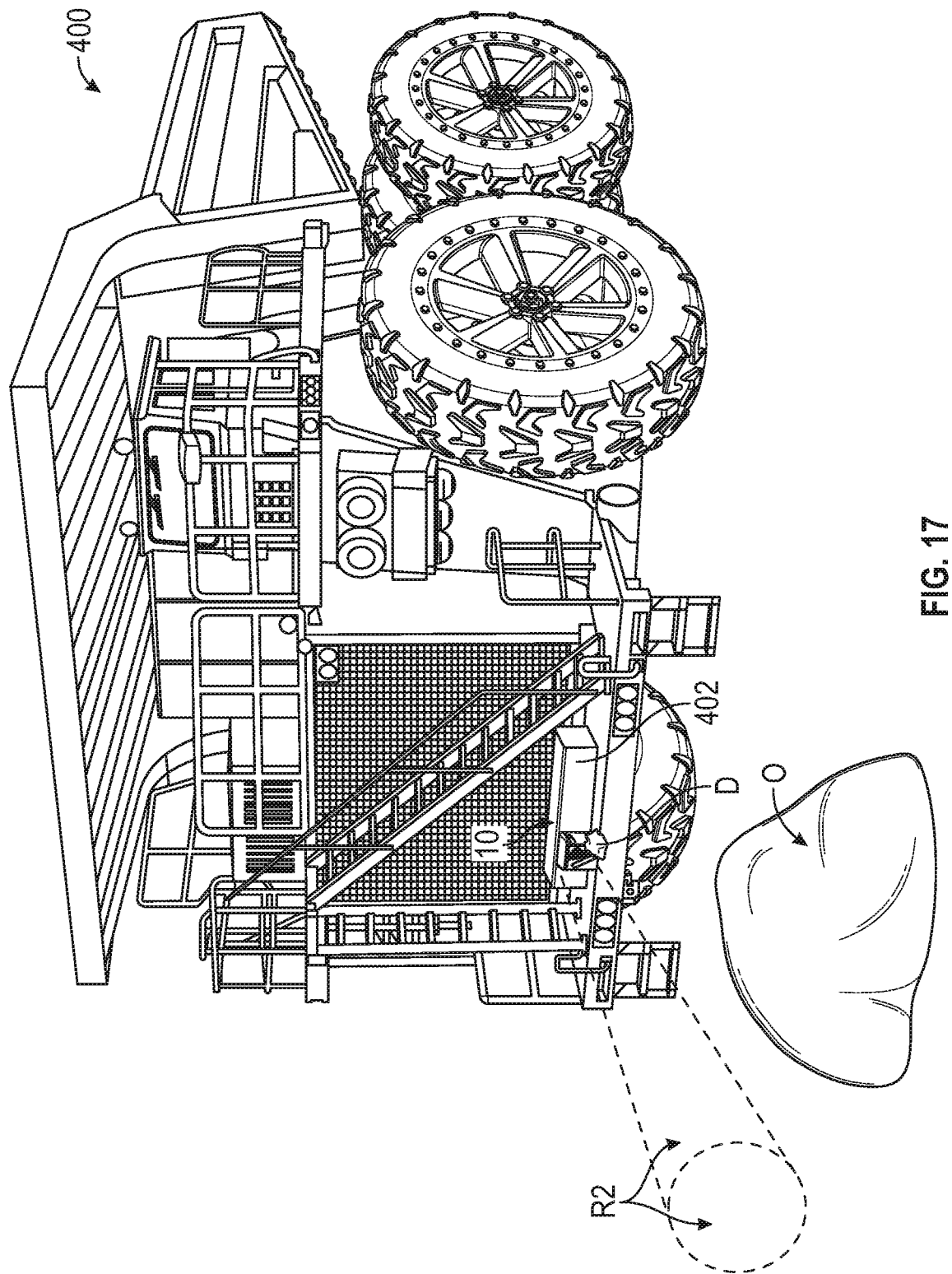
FIG. 17 is a front perspective view of the exemplary heavy-duty dump truck with the embodiment of FIG. 1 installed on its front side, but where dirt or debris has coated a portion of the radome so that the unit does not detect the boulder in front of the truck, but wherein the monitoring system has already alerted the operator of the radome performance problem so that the operator can stop movement of the truck, avoid the boulder, and rectify the problem.

FIG. 17 illustrates unit 10 installed on a front surface 402 of the heavy-duty dump truck 400, for detecting objects O that the operator cannot see or may not notice in time to avoid them. Because the radome of unit 10 is partially covered by dirt and debris D in FIG. 16, the dashed-line radar view lines R2 indicate that the radar unit does not "see" the boulder or other object O. However, because unit 10 includes an embodiment of the invented blockage detection circuit, it will be understood that, like the scenario in FIG. 16, the unit 10 in FIG. 17 has already alerted the operator of the truck 400 of the reduced-performance of the unit 10, and that the operator (now shown) is exiting the vehicle to clean the radome. It will be understood from this document that other use scenarios may occur, for example, wherein the entire radome, and hence all or substantially all of the radar transmissions and echoes, may be blocked, which could create an equally or even more dangerous situation were it not for the monitoring and alerting system if the invention. It will be understood from this document and the figures that blockage detection circuitry in the radar based object detection unit 10 on front surface 402 installed on truck 400 in FIG. 17 will be operatively connected to and will actuate audible and/or visual alert/alarm equipment (not shown) that may be inside the cab of truck 400, for example, inside the cab of truck 400 that is shown to have a cab window/windshield and windshield-wipers in FIG. 17.

Certain embodiments of the invention may be described as: a radar-based object detection device comprising a radar antenna operatively connected to a processor unit, and a radome covering at least the radar antenna to protect at least the radar antenna (and typically also the processor unit), the device being configured to send radar signals and receive echoes when the radar signals return from an object (in the case where the device is installed on a vehicle, for example, to indicate to an operator of a vehicle when target objects are detected in the vicinity of the vehicle), the device further including a monitoring and alert system comprising including one or more electrodes attached to an inner surface of the radome, the one or more electrodes operatively connected to a radar blockage detection circuitry in said device that measures self-capacitance of each electrode and is configured to send an alert signal when said self-capacitance of any of said one or more electrode crosses a threshold that indicates that the radome is affected by dirt or debris attached to an outer surface of the radome. Said one or more electrodes may comprise only a single electrode attached to a first region of the radome inner surface, so that the single electrode and said radar blockage detection circuitry monitors said first region to test for dirt or debris attached to said first region. In the case of a single electrode, that electrode may be the only electrode of any kind attached to the radome. Said one or more electrodes may comprise multiple electrodes attached to different regions of the radome inner surface, so that the multiple electrodes and said radar blockage detection circuitry separately monitor each of said different regions to test for dirt or debris attached to any of the different regions. One of multiple electrodes may be attached at a first side of the inner surface and another of the multiple electrodes may be attached to a second side of the inner surface that is opposite of the first side, so that the electrodes are distanced from each other to test for dirt or debris attached to distanced regions of the radome. Preferably, all of said one or more electrodes is/are only on the inner surface of the radome, not on the outer surface of the radome, and not on both inner and outer surfaces of the radome. The radome is typically formed entirely or substantially of a curved radome wall that has a wall thickness of substantially or entirely consistent thickness, and the different regions of the radome inner surface to which the electrodes are attached preferably are distanced from each other an amount that is at least 20 times the wall thickness of the radome. In preferred embodiments, the alert signal is sent when self-capacitance of any one electrode, not necessarily multiple of the electrodes, crosses said threshold. Said radar blockage detection circuitry may comprise signal processing circuitry for processing self-capacitance signals from the one or more electrodes, and algorithm circuitry that compares the measured self-capacitance to said threshold to trigger said alert signal. The one or more electrodes may be, for example, an electrically-conductive strip affixed to said inner surface. Each electrode/strip has a significant surface area that contact the radome inner surface, for example, the electrode/electrode-strip extends along at least ⅓ (or more preferably at least ½) of a side of said inner surface, or at least ⅓ (or more preferably at least ½) of either the width or the length of said inner surface, to increase the size of the region monitored by each electrode/electrode-strip. In certain embodiments of the systems described in this paragraph, the detection unit is operatively connected to a vehicle for sensing people and hazardous objects in the vicinity of the vehicle. Certain embodiments may comprise, consist essentially of, or consist of the radome, and one or more electrodes attached to the radome, of any of the detection units described in this paragraph.

Certain embodiments may be described as: a radome monitoring and alert system for inclusion and use in a radar-based object detection unit comprising a radar antenna, an electronic processor unit, and a radome, that are operatively connected to send radar signals and receive echoes indicating the presence of a target object, the system being characterized by: one or more electrodes attached to an inner surface of the radome and operatively connected to radar blockage detection circuitry in said object detection unit that measures self-capacitance of each electrode and is configured to send an alert signal from the object detection unit to an operator when said self-capacitance crosses a threshold that indicates that the radome is blocked or partially blocked by dirt or debris attached to the radome. The monitoring and alert system may comprise only a single electrode on the radome so that said alert signal results from monitoring of self-capacitance of only the single electrode. The monitoring and alert system may comprises a plurality of said electrodes, with the self-capacitance of each of the plurality of electrodes separately and independently measured and compared to said threshold so that the alert signal is sent based on crossing the threshold by any one electrode. Preferably, all of said one or more electrodes is/are only on the inner surface of the radome, not on the outer surface of the radome, and not on both inner and outer surfaces of the radome.

In the specification and drawings, reference is made to particular features (including method steps) of certain embodiments. It is to be understood that the disclosure of the invention includes all possible combinations of such particular features. For example, where a particular feature is disclosed in the context of a particular aspect, a particular embodiment, or a particular figure, that feature can also be used, to the extent appropriate, in the context of other particular aspects, embodiments, and figures, and in the invention generally. Although the invention has been described above with reference to particular means, materials and embodiments, it is to be understood that the invention is not necessarily limited to these disclosed particulars, but extends instead to all equivalents within the broad scope of this disclosure and drawings, and the following claims.

The invention claimed is:

1. A radar-based object-detection device for a vehicle, the device comprising a radar antenna, a radome adapted to permit transmitted radar signals, and return echoes, to pass through the radome, and a radome condition monitoring and alert system comprising:
a first electrode attached to an inner surface of a first region of the radome and exhibiting self-capacitance, and the first electrode operatively connected to blockage detection circuitry in said device that measures said self-capacitance of the first electrode and that provides an alert signal when said self-capacitance of the first electrode crosses a threshold indicating that the radome condition is affected by dirt or debris on an outer surface of the radome.

2. The device of claim 1, wherein said first electrode is the only electrode attached to the radome.

3. The device of claim 1, wherein the device comprises a second electrode attached to an inner surface of a second region of the radome and exhibiting self-capacitance, and the second electrode operatively connected to said blockage detection circuitry, wherein said blockage detection circuitry further measures said self-capacitance of the second electrode and sends an alert signal when said self-capacitance of the second electrode crosses said threshold indicating that the radome condition is affected by dirt or debris on the outer surface.

4. The device of claim 3, wherein said first electrode is at a first side of the inner surface and said second electrode is at a second side of the inner surface that is opposite of the first side, so that said first electrode is distanced from said second electrode.

5. The device of claim 4, wherein the radome has a wall thickness, and the first and second electrodes are distanced from each other an amount that is at least 20 times the wall thickness of the radome.

6. The device of claim 4, wherein said alert signal is sent when self-capacitance of either one of said first electrode and said second electrode crosses said threshold.

7. The device of claim 3, wherein said blockage detection circuitry comprises signal processing circuitry adapted for processing self-capacitance signals from the first electrode, and algorithm circuitry adapted for comparing the measured self-capacitance of the first electrode to said threshold to trigger said alert signal.

8. The device of claim 7, wherein said signal processing circuitry is adapted for processing self-capacitance signals from the second electrode, and said algorithm circuitry is adapted to compare the measured self-capacitance of the second electrode to said threshold to trigger said alert signal.

9. The device of claim 1, wherein said first electrode is an electrically-conductive strip affixed to said inner surface that extends along at least ⅓ of a side of said inner surface.

10. The device of claim 3, wherein said second electrode is an electrically-conductive strip affixed to said inner surface that extends along at least ⅓ of a side of said inner surface.

11. The device of claim 1, comprising no electrodes on an outer surface of the radome.

12. The device of claim 3, comprising no electrodes on an outer surface of the radome.

13. A radar-based object-detection device for sensing objects or persons near a vehicle, the device comprising a radar antenna, a radome covering the radar antenna and adapted to permit transmitted radar signals, and return echoes, to pass through the radome, and a radome condition monitoring and alert system comprising:
electrodes attached to an inner surface of the radome and each of the electrodes exhibiting self-capacitance, and each of the electrodes operatively connected to blockage detection circuitry in said device that is adapted to separately and independently measure the self-capacitance of each of the electrodes and that is adapted to send an alert signal when the self-capacitance of any one of the electrodes crosses a threshold that indicates that the radome condition is affected by dirt or debris on an outer surface of the radome.

14. The device of claim 13, wherein there are no electrodes on the outer surface of the radome.

15. A radar-based object-detection device for sensing objects or persons near a vehicle, the device comprising a radar antenna, a radome covering the radar antenna and adapted to permit transmitted radar signals, and return echoes, to pass through the radome, and a radome condition monitoring and alert system comprising multiple electrodes attached to the radome, each electrode exhibiting self-capacitance, and the device further comprising circuitry to monitor the self-capacitance of each electrode and to send an alert, when the self-capacitance of any of the electrodes crosses a threshold, that dirt or debris is affecting the radome, and wherein the device is not adapted to measure and not adapted to monitor mutual-capacitance between a pair of any two of the electrodes.

16. A radome-condition monitoring and alert system for an object-detection device comprising a radar antenna, the system comprising a radome for covering the radar antenna and adapted to permit transmitted radar signals, and return echoes, to pass through the radome, and an electrode attached to the radome, the electrode exhibiting self-capacitance, wherein the system comprises circuitry to monitor the self-capacitance of the electrode and to signal an alert, when the self-capacitance crosses a threshold, that dirt or debris is affecting the radome.

17. The system of claim 16 comprising multiple of said electrodes, each exhibiting self-capacitance, and wherein said circuitry is adapted to separately and independently monitor the self-capacitance of each of the electrodes and to send an alert when the self-capacitance of any one of said electrodes crosses said threshold.

18. The system of claim 17, wherein each of the electrodes is attached to an inner surface of the radome.

19. The system of claim 17, comprising no electrodes on an outer surface of the radome.

20. The system of claim 17, wherein a first electrode of said electrodes is attached to an inner surface of a first region of the radome, and a second electrode of said electrodes is attached to an inner surface of a second region of the radome, wherein the radome has a wall thickness, and the first region and second region of the radome are distanced from each other an amount that is at least 20 times the wall thickness of the radome.

21. The system of claim 20, wherein said alert signal is sent when self-capacitance of either one of said first electrode and said second electrode, not both of the first and second electrodes, crosses said threshold.

22. A radome-condition monitoring system for an object-detection device comprising a radar antenna, the system comprising a radome for covering the radar antenna and performing by permitting transmitted radar signals, and return echoes, to pass through the radome, an electrode attached to the radome and exhibiting self-capacitance, and circuitry adapted to monitor the self-capacitance of the electrode to detect degradation of radome performance due to dirt or debris on the radome.

23. The system as in claim 22, wherein the system comprises a plurality of said electrodes attached to the radome, and wherein the system is not adapted to measure mutual-capacitance between any pair of two of the electrodes.

24. The system as in claim 23, wherein all electrodes of said plurality of electrodes are attached to an inner surface of the radome.

* * * * *